(12) United States Patent
Squier

(10) Patent No.: US 7,288,304 B2
(45) Date of Patent: Oct. 30, 2007

(54) METALLIZED PATCH LABELS

(75) Inventor: JoAnn H. Squier, Bloomfield, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 697 days.

(21) Appl. No.: 10/331,582

(22) Filed: Dec. 30, 2002

(65) Prior Publication Data

US 2003/0180490 A1 Sep. 25, 2003

Related U.S. Application Data

(63) Continuation-in-part of application No. 10/098,806, filed on Mar. 15, 2002, now abandoned.

(51) Int. Cl.
*B29D 22/00* (2006.01)
*B29D 23/00* (2006.01)
*B32B 5/22* (2006.01)
*B32B 3/26* (2006.01)
*B32B 5/14* (2006.01)

(52) U.S. Cl. .................. 428/35.7; 428/35.8; 428/35.9; 428/319.7; 428/317.9; 428/308.4; 428/316.6; 428/315.9; 428/314.4; 428/315.5

(58) Field of Classification Search .......... 428/35.7, 428/35.8, 35.9, 319.7, 317.9, 308.4, 316.6, 428/315.9, 314.4, 315.5; 264/342 R; 156/242, 156/243, 244.11
See application file for complete search history.

(56) References Cited

U.S. PATENT DOCUMENTS

| 4,060,168 | A | 11/1977 | Romagnoli |
| 4,377,616 | A | 3/1983 | Ashcraft et al. |
| 5,061,334 | A | 10/1991 | Paules |
| 5,063,264 | A | 11/1991 | Nakajima |
| 5,174,852 | A | 12/1992 | Zepf |
| 5,288,548 | A | 2/1994 | Weber |
| 5,486,253 | A | 1/1996 | Otruba |
| 5,595,818 | A | 1/1997 | Hopfe et al. |

(Continued)

FOREIGN PATENT DOCUMENTS

EP 0403161 12/1990

(Continued)

OTHER PUBLICATIONS

"Chemical Microstructure of Polymer Chains" Jack L. Koenis, Wiley-Interscience Publications, John Wiley and Sons, New York Chichestor, Brisbane, Toronto ISBN 0-471-07725-9.

(Continued)

*Primary Examiner*—Nasser Ahmad
*Assistant Examiner*—Catherine A. Simone
(74) *Attorney, Agent, or Firm*—D. M. Tyus

(57) ABSTRACT

A metallized thermoplastic label includes a first skin layer containing a thermoplastic and a first cavitating agent, wherein the first skin layer has a first side and a second side, the first skin layer is cavitated, and the first side of the first skin layer is adapted to be used in contact with a cold glue adhesive. The label further includes a cavitated core layer and a second skin layer that is metallized. The particle size of the cavitating agent in the core layer is selected to achieve a desired appearance, especially luster, of the metal layer.

15 Claims, 1 Drawing Sheet

U.S. PATENT DOCUMENTS

| | | |
|---|---|---|
| 5,618,651 A | 4/1997 | Stevens et al. |
| 5,817,395 A | 10/1998 | Karsten et al. |
| 5,888,640 A * | 3/1999 | Marotta et al. .......... 428/308.4 |
| 5,888,648 A | 3/1999 | Donovan et al. |
| 5,897,722 A | 4/1999 | Bright |
| 5,929,128 A | 7/1999 | Whetten et al. |
| 5,972,496 A | 10/1999 | Bader et al. |
| 5,981,079 A | 11/1999 | Mount, III et al. |
| 6,013,353 A | 1/2000 | Touhsaent |
| 6,025,100 A | 2/2000 | Verschueren et al. |
| 6,048,608 A | 4/2000 | Peet et al. |
| 6,077,602 A | 6/2000 | Liestman et al. |
| 6,083,342 A | 7/2000 | Frey |
| 6,139,935 A | 10/2000 | Cullen et al. |
| 2001/0036542 A1 * | 11/2001 | Marks ........................ 428/212 |

FOREIGN PATENT DOCUMENTS

WO     WO 02/059860     8/2002

OTHER PUBLICATIONS

"Integrated Infrared Band Intensity Measures of Stereoregularity in Polypropylene" J.L. Koenig & A. Van Roggen, Journal of Applied Polymer Science, vol. 9, pp. 359-367 (1965).

* cited by examiner

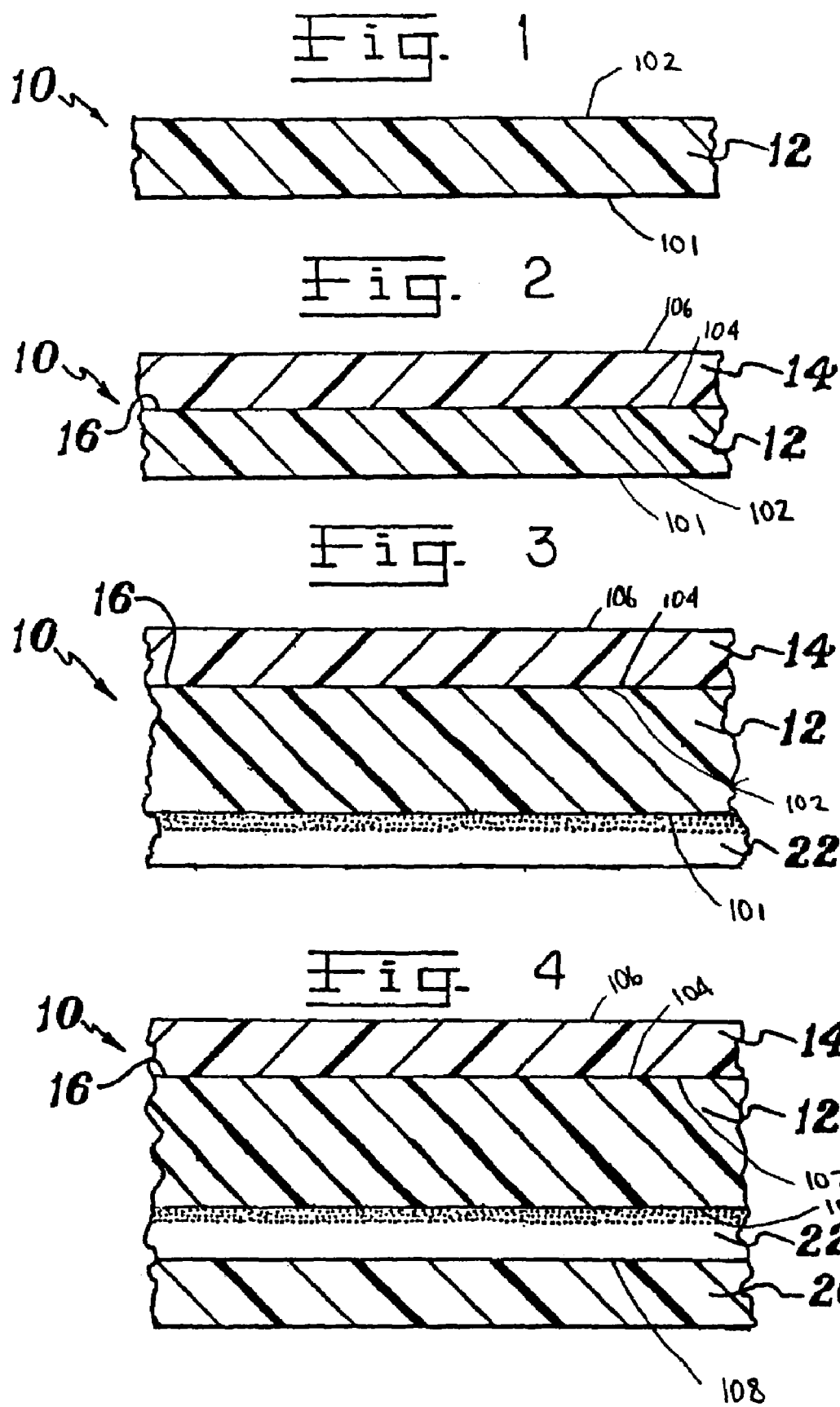

METALLIZED PATCH LABELS

CROSS REFERENCE TO RELATED APPLICATION

This application is a continuation-in-part of U.S. application Ser. No. 10/098,806, filed Mar. 15, 2002, now abandoned.

BACKGROUND

This invention relates to metallized labels generally, and more specifically, but without limitation, to die cut or patch metallized labels for use with cold glue, and to films for making such labels. In one aspect, the invention relates to the use of such labels on substrates, where the label forms a destruct bond with the substrate such that the label delaminates. In another aspect, the invention relates to labels which possess the beneficial properties of the known thermoplastic labels, but which exhibit improved initial adhesion and destruct bonding, such as delamination.

In many label applications, it is desirable that the label stock from which the labels are cut be a film of polymeric material rather than paper. Polymeric film can provide one or more of the following properties lacking in paper: durability, strength, water resistance, curl resistance, abrasion resistance, gloss, transparency and other properties. Obviously, the polymeric material must meet the practical requirements of commercial manufacture and use. Material costs must be competitive. The film must be formable by a suitable commercial process, such as cast film extrusion or blown film extrusion, requiring that the molten film material be flowable to the correct degree to accomplish proper film formation. The formed film must be capable of hot-stretching without deleterious effect, because it is generally advantageous to hot-stretch and anneal the formed film, so as to orient the film and impart a stiffness to the film that is different in machine and cross directions. The film must have a printable face and be die-cuttable and matrix-strippable when used in a pressure-sensitive label construction.

In the die cut, cold glue label applications, there are certain other desired characteristics. Cold glues are widely used as an economical alternative to wrap-around or pressure-sensitive labels. Cold glue labels must be capable of providing a means for drying the adhesive and providing good initial adhesion, while not exhibiting visual defects.

Olefin blends have been found in many respects to be a preferred material to meet the demands of polymeric, die-cut label manufacture. The relatively low cost of the olefinic resins, and their high strength allowing for low caliper film, tend to minimize overall material cost. Hot-stretched polypropylene and/or polyethylene provides stiffness in the machine direction even at relatively low-caliper thicknesses for adequate print registration and dispensing while providing sufficiently low tensile modulus and, in particular, sufficiently high elongation in the cross direction to allow good conformability.

Olefin blends have been found useful to produce, on an economical basis, printable 3.5 mil (caliper measured) coextruded labels die-cut from biaxially hot-stretched film that are durable, strong and water-resistant, and that generally have good structural and surface properties and performance characteristics. Biaxial stretching also makes an important contribution to performance by creating substantial differentials between machine direction (MD) and cross direction (CD) stiffnesses, tensile moduli, elongations, and other properties.

Paper labels have been used in the art in conjunction with a cold glue adhesive for application to glass and plastic containers. The paper labels exhibit good initial adhesion, adhesive drying, and destruct bonds. A metallized layer may be applied to paper labels to achieve a metallized graphic appearance. However, the inherent surface roughness of some papers does not encourage a highly reflective mirror-like surface.

U.S. Pat. No. 4,060,168 discloses a label assembly that includes a strip or web of backing material with a series of printed labels arranged in serial order. The backing material includes a die cut portion opposed to the label, which remains adhered to the label upon application of the label to a container. The cut portion may include printing and serves as a promotional item with improved pilfer resistance. U.S. Pat. No. 4,060,168 is incorporated herein by reference.

U.S. Pat. No. 5,061,334 discloses a high speed labeling machine and method for transferring labels to articles, such as cans. The labeling machine includes a device for supplying articles to be labeled, a label transfer wheel provided with individual groups of closely-spaced vacuum holddown ports to enable a succession of closely-spaced labels to be supported by the transfer wheel and carried by the transfer wheel to the articles, and a pressure-severing device for releasing the label from a carrier stock for subsequent transfer from a transfer wheel to the article to be labeled. Sprocket holes are utilized to precisely align a label. The labels may be die cut on the printing press and retained on the carrier by pinpoint attachments or they may be die cut as the label is advanced. In one particular embodiment, single layer label tapes with release agent on one surface and a pressure sensitive adhesive on the other surface provide added advantages of smaller spool sizes and faster speeds. Single layer label tapes also make tamper-evident packaging very versatile and advantageous. Another aspect disclosed in this patent is the significantly improved economics by reducing the number of layers to one instead of two for normal pressure sensitive labels as well as by eliminating the cost and problems associated with using glue applicators with many types of labeling products. U.S. Pat. No. 5,061,334 is incorporated herein by reference.

U.S. Pat. No. 5,174,852 discloses a method for attaching labels to containers where the labels are removed from a stack by rolling contact with an adhesive surface coated with a cold glue. Additionally, prior to termination of the removing step, localized hot glue coating is applied to the foremost label in the stack. After the label has thus been coated with cold glue and hot glue, it is peeled off the adhesive surface and pressed into contact of its glue-coated backside with a container. The provision that the hot glue coating is applied to the label while it is still held in the magazine ensures that the shape and position of the hot glue coating is fully independent of the speed of the labeling operation. U.S. Pat. No. 5,174,852 is incorporated herein by reference.

U.S. Pat. No. 5,288,548 discloses a multilayer label stock structure comprising a label stock of polypropylene film having on one side thereof a highly printable blend of (A) alkaline acrylate copolymer and (B) an interpolymer of an alkyl acrylate, an alkyl methacrylate and an alkyl acrylate acid. U.S. Pat. No. 5,288,548 is incorporated herein by reference.

U.S. Pat. No. 5,486,253 discloses a method of labeling containers utilizing a labeler having a multiple port vacuum drum. The multiple port vacuum drum has a first cavity which is supplied with one level of vacuum suitable for picking up label segments from a cutter with limited tension. The vacuum drum has a second cavity, which is supplied with another, higher level of vacuum suitable for firmly griping the label segments as an adhesive or the like is applied to the label segment. The second cavity may be further divided into a label application segment with lower vacuum pressure. The cutter drum has an arcuate cavity to which vacuum is supplied at the end first contacting the labeling material web with reduced vacuum being provided at the label cut off point and label release point. U.S. Pat. No. 5,486,253 is incorporated herein by reference.

U.S. Pat. No. 5,897,722 discloses a process for applying labels to articles by first adhering a limited portion of the label to the article and subsequently making additional portions of the label adhesive so that they will adhere to the article after the label is affixed to the article. The leading and trailing edges of the label may be bonded to the article or each other to affix the label to a container or other such article. The portions of the label between the leading and trailing edges may be either provided with an adhesive agent that is in a non-adhesive state or be formed from a label material which is not normally adhesive but can be rendered adhesive through an additional process step. For example, coated polyethylene film can be applied to a container by means of a hot melt adhesive and then subsequently heated to a temperature at which the polyethylene material becomes adhesive causing it to stick to the container. Other labeling materials can be printed with an adhesive that remains substantially non-adhesive until heated or activated by means of radiation, application of a chemical activating agent or by application of mechanical force. U.S. Pat. No. 5,897,722 is incorporated herein by reference.

U.S. Pat. No. 6,083,342 discloses a system and method for rapidly labeling a blow-molded hollow container made of a plastic composition subject to out-gassing after de-molding. Otherwise, conventional high speed silk screen labeling technology and processing is employed shortly after container fabrication de-molding in order to accurately deposit a continuous liquid layer of conventional silk screen ink over an external container surface area designated for application thereon of a self-adhering pre-printed label. The label is rapidly and accurately transfer applied over the silk screen coated area immediately after the same has dried, and even while out-gassing is still occurring from the de-molded to container. However, the protective ink barrier coating prevents formation of bubbles beneath the label. Those gases in the container wall resident beneath the label-affixed area can then nevertheless out-gas by migrating out of the container internal wall surface. Also, labeling may be silk screen imprinted on the container surface in a designated label-receiving area, and/or on non-designated surface area concurrently with barrier coating of the designated area. A gas-blocking clear ink barrier layer may be silk screened over the silk screen imprinting, and then the label applied over the gas-blocking layer of clear ink when dry. The label may be "peelable" for customer rebate return without thereby altering the labeling information remaining on the container. The pre-printed label may be a replicate of the label-covered imprinting so that the "trade dress" need not be altered by the peelable label, and so that the container surface area available for permanent labeling is maximized. U.S. Pat. No. 6,083,342 is incorporated herein by reference.

U.S. Pat. No. 6,139,935 discloses an oxygen-absorbing label consisting of a base sheet, adhesive on the base sheet for securing the base sheet to an internal surface of a container, an oxygen-absorbing composition on the base sheet, and a cover sheet secured to the base sheet to confine the oxygen-absorbing composition there between. The cover sheet is fabricated of material which will permit oxygen to pass therethrough but will not stain due to the oxidation of the oxygen-absorbing composition or due to contact with materials in the container. A plurality of the foregoing labels are mounted on a web to be used with conventional labeling equipment. U.S. Pat. No. 6,139,935 is incorporated herein by reference.

SUMMARY

One embodiment of this invention is a thermoplastic label comprising (a) a first skin layer comprising polypropylene or polyethylene and a first cavitating agent, wherein the first skin layer has a first side and a second side and the first skin layer is cavitated;

(b) a core layer comprising polypropylene and a second cavitating agent wherein the core layer has a first side and a second side and the first side of the core layer is adjacent to the second side of the first skin layer; and (c) a second skin layer comprising a polyolefin having a first side and a second side, wherein the first side of the second skin layer is adjacent to the second side of the core layer and the second side is metallized, wherein the particle size of the second cavitating agent is selected to promote a desired type of luster to the metallized surface of said second skin layer.

The second skin layer comprising a polyolefin may be, for example, a propylene homopolymer, a copolymer of propylene and an α-olefin, such as ethylene or butene-1, a terpolymer of propylene, ethylene, and butene-1, or blends thereof.

A method for preparing this metallized thermoplastic label comprises the steps of:

(i) forming an extrudable mass of said thermoplastic of said first skin layer and said first cavitating agent;

(ii) forming an extrudable mass of said polypropylene of said core layer and said second cavitating agent;

(iii) forming an extrudable mass of said polypropylene of said second skin layer;

(iv) coextruding the extrudable masses of steps (i), (ii) and (iii) to form a cast film;

(v) stretching said cast film of step (iv) in the machine direction;

(vi) stretching the stretched film of step (v) in the transverse direction; and (vii) applying a metal layer to the to the surface of said second skin layer, wherein the particle size of the second cavitating agent is selected to promote a desired type of luster to the metallized surface of said second skin layer.

Another embodiment of this invention is the above-mentioned thermoplastic label adapted to be applied to a container, wherein a cold glue is applied to the first side of the first skin layer.

Another embodiment of this invention is a container having a metallized thermoplastic label, said container comprising a surface of the container; a cold glue adjacent to the surface; and the above-mentioned metallized label, wherein the first skin layer is cavitated and the first side is adjacent to the cold glue.

When the cavitating agent in the core layer has a median particle size of 1.5 microns or less, the metallized surface may have a bright mirror like appearance.

When cavitating agent in the core layer has a median particle size of 2 microns or more, the metallized surface may have a less reflective appearance than labels having a smaller, e.g., 1.5 microns or less, cavitating agent in the core layer.

There is also a correlation between the surface roughness of the second skin layer, before metallization, and the appearance of the metallized surface. When the surface roughness of the second skin layer, before metallization, has an $R_a$ value of from 0.1 to 0.3 microns, the metallized surface has a highly bright mirrored appearance. When the surface roughness of the second skin layer, before metallization, has an $R_a$ value of from 0.3 to 0.8 microns, the metallized surface has a less bright mirrored appearance. When the surface roughness of the second skin layer, before metallization, has an $R_a$ value of from 1.0 to 1.3 microns, the metallized surface has an even less bright mirrored appearance.

It will be understood that measurements of $R_a$ values are well known in the art. In particular, such measurements may be made with a variety of perthometers according to manufactures instructions. A particular model is an M2 Perthometer from Mahr Corporation, Cincinnati, Ohio, especially such a model equipped with a 150 stylus. The measurement of $R_a$ with a perthometer is described in U.S. Pat. Nos. 5,618,651; 6,025,100; 5,817,395; and 5,595,818.

The skin layer to be metallized is preferably free of any cavitating agent. Further, an optional tie layer between the skin layer to be metallized and the core layer is also preferably free of any cavitating agent.

The skin layer to be metallized may be subjected to surface treatment, such as, for example, flame treatment, corona treatment, or plasma treatment. For example, the skin layer to be metallized may be corona-treated, with a target of 38-40 dynes/cm. Indeed, in certain embodiments, both the cavitated skin layer, e.g., the first skin layer, and the skin layer to be metallized, e.g., the second skin layer, may be surface treated, e.g., flame treated, corona treated, or plasma treated.

Advantages of the thermoplastic label include one or more of the following:

1. A label that can be used with cold glue.
2. A label that exhibits good initial adhesion when used with a cold glue.
3. A label that exhibits destruct bonds when used with a cold glue.
4. A label that exhibits delamination when used with a cold glue.
5. A label that is an economical alternative to wrap around or pressure sensitive labels.
6. A label that exhibits the properties of durability, strength, water resistance, abrasion resistance, gloss, transparency and/or other properties.

BRIEF DESCRIPTION OF THE DRAWINGS

FIG. 1 is a cross-sectional view of a thermoplastic label constructed in accordance with the present invention and comprising a first skin layer as previously described.

FIG. 2 is a cross-sectional view of the thermoplastic label of FIG. 1, with a core layer added.

FIG. 3 is a cross-sectional view of the thermoplastic label of FIG. 2, with a cold glue applied to the first skin layer.

FIG. 4 is a cross-sectional view of the label shown in FIG. 3, as attached to a container.

DETAILED DESCRIPTION

Referring now to the accompanying FIGS. 1-4, the present invention is illustrated in its various aspects.

FIG. 1 depicts a thermoplastic label 10 which consists of a first skin layer 12 consisting of polypropylene or polyethylene and a first cavitating agent, the first skin layer having a first side 101 and a second side 102 where the first skin layer 12 is cavitated.

In one embodiment, the polypropylene of the first skin layer 12 is a homopolymer polypropylene. Suitable polypropylenes can include a standard film grade isotactic polypropylene or a highly crystalline polypropylene.

Highly crystalline polypropylene (HCPP) has a high isotactic stereoregularity, resulting in higher crystallinity than conventional isotactic polypropylene, i.e, greater than about 93%. (Standard film grade isotactic polypropylene is defined herein as having an isotactic stereoregularity of from about 90% to about 93%). The HCPP thus exhibits higher stiffness, surface hardness, lower deflection at higher temperatures and better creep properties than conventional isotactic polypropylene. Further information relating to HCPP, including methods for preparation thereof, is disclosed in U.S. Pat. No. 5,063,264, incorporated herein by reference.

For purposes of the present invention, stereoregularity can be determined by IR spectroscopy according to the procedure set out in "Integrated Infrared Band Intensity Measurement of Stereoregularity in Polypropylene," J. L. Koenig and A. Van Roggen, Journal of Applied Polymer Science, Vol. 9, pp. 359-367 (1965) and in "Chemical Microstructure of Polymer Chains," Jack L. Koenig, Wiley-Inerscience Publication, John Wiley and Sons, New York, Chichester, Brisbane, Toronto. Stereoregularity can also be determined by decahydronaphthalene (decalin) solubility and nuclear magnetic resonance spectroscopy (NMR).

Commercially suitable HCPPs include Amoco 9117 and Amoco 9119 (available from Amoco Chemical Co. of Chicago, Ill.), and Chisso HF5010 and Chisso XF2805 (available from Chisso Chemical Co., Ltd. of Tokyo, Japan). Suitable HCPPs are also available from Solvay in Europe.

In another embodiment, the polyethylene of the first skin layer 12 is a high density polyethylene, such as, for example, a linear high density polyethylene having a density of greater than 0.940 g/cc, e.g, from about 0.941 to about 0.970 g/cc. It is well known that the density of polyethylene is decreased by copolymerizing ethylene with other olefins, especially those having four or more carbon atoms. Therefore, in a preferred embodiment, it will be understood that the linear high density polyethylenes is free or substantially free of other comonomers. It is also well known that a linear high density polyethylene can be prepared with a variety of coordination-type catalysts.

As described in U.S. Pat. No. 5,929,128, linear high density polyethylene is essentially free of long chain branching. U.S. Pat. No. 5,929,128 is incorporated herein by reference in its entirety.

In another embodiment, the first cavitating agent is calcium carbonate comprising 25 percent or more by weight of the first skin layer. In another embodiment, the calcium carbonate comprises 35 percent or more by weight of the first skin layer. In another embodiment, the calcium carbonate comprises 50 percent or more by weight of the first skin layer.

In another embodiment, the first side 101 of the first skin layer 12 has holes formed by the first cavitating agent. In another embodiment, the median particle size of the first cavitating agent is 1.4 microns. In another embodiment, the median particle size of the first cavitating agent is 3.2 microns. In another embodiment, the median particle size of the first cavitating agent is at least about 1.4 microns. In another embodiment, the median particle size of the first cavitating agent is at least about 3.2 microns.

Possible first cavitating agents include polyamides, polybutylene terephthalate, polyesters, acetals, acrylic resins, nylons, solid preformed glass spheres, hollow preformed glass spheres, metal beads, metal spheres, ceramic spheres, calcium carbonate, and mixtures thereof.

In one embodiment, the label 10 has a thickness of from about 1 mil. to about 10 mils. In another embodiment, the label 10 has a thickness of from about 3 mils. to about 5 mils. In another embodiment, the label 10 is uniaxially oriented. In another embodiment, the label 10 is biaxially oriented.

In one embodiment, the first skin layer 12 of the thermoplastic label 10 accounts for at least about 15 percent by weight of the thermoplastic label 10. In another embodiment, the first skin layer 12 accounts for at least about 30 percent by weight of the thermoplastic label 10.

FIG. 2 is a cross sectional view of the thermoplastic label 10 of FIG. 1 with a core layer 14 added. The thermoplastic label 10 has a first skin layer 12 having a first side 101 and a second side 102, a core layer 14 having a first side 104 and a second side 106, and an interface 16 between the first skin layer 12 and the core layer 14, where the interface is the connection of the second side 102 of the first skin layer 12 and the first side 104 of the core layer 14.

In one embodiment, the core layer 14 comprises polypropylene and a second cavitating agent. The second cavitating agent can be selected from the group consisting of polyamides, polybutylene terephthalate, polyesters, acetals, acrylic resins, solid preformed glass spheres, hollow preformed glass spheres, metal beads, metal spheres, ceramic spheres, calcium carbonate, COC's, and mixtures thereof. COC's (cyclic olefin polymers and cyclic olefin copolymers) are described in U.S. Pat. No. 6,048,608 issued to Peet, et al; this patent is incorporated herein by reference in its entirety. In a particularly preferred embodiment, the polypropylene of the core layer 14 is either isotactic or high crystalline polypropylene.

In one embodiment, the core layer 14 comprises polyethylene and a second cavitating agent. The second cavitating agent may be selected from the group consisting of polyamides, polybutylene terephthalate, polyesters, acetals, acrylic resins, solid preformed glass spheres, hollow preformed glass spheres, metal beads, metal spheres, ceramic spheres, calcium carbonate, COC's, and mixtures thereof. In a preferred embodiment, the polyethylene of the core layer 14 is high-density polyethylene.

As mentioned previously, when the cavitating agent in the core layer has a relatively small particle size, e.g., a median particle size of 1.5 microns or less, the appearance of the metallized skin layer tends to be highly reflective and mirrored. An example of such a small particle size cavitating agent is polybutyleneterephthalate (PBT), such as 1300A, available from Ticona. This PBT cavitating agent is typically spherical in shape and has a particle size range of from about 0.5 to 2.0 microns.

Another example of a small particle size cavitating agent is the calcium carbonate in Ampacet's Pearl 2, which is in the form of a masterbatch of polypropylene (PP) and CaCO₃. The particles of CaCO₃ in Pearl 2 are irregular in shape with a median particle size of 1.5 microns and with the largest particles being as large as 6 to 8 microns. These particle sizes may be determined with a sedigraph, which measures the time it takes for particles to settle through different diameter sieves.

When the cavitating agent in the core layer has a relatively large particle size, e.g., a median particle size of 2.0 microns or more, the appearance of the metallized skin layer tends to be less reflective and less mirrored. An example of a large particle size cavitating agent is the calcium carbonate in Ampacet's Pearl 70, which is in the form of a masterbatch of polypropylene (PP) and CaCO₃. The particles of CaCO₃ in Pearl 70 are irregular in shape with a median particle size of 2.0 microns and with the largest particles being as large as 10 microns. These particle sizes may also be determined with a sedigraph.

In another embodiment, a second skin layer (not shown) is added to the thermoplastic label 10 so that it is adjacent to the core layer 14, and, in particular, adjacent to the second side 106 of the core layer 14. In one embodiment, the second skin layer (not shown) comprises any polyolefin. Suitable polyolefins for the second skin layer include polyethylene, polypropylene, polybutylene, polyolefin copolymers, polyolefin terpolymers, and mixtures thereof. Preferably, the second skin layer contains propylene. For example, the second skin layer is preferably a propylene homopolymer, a copolymer of propylene and an α-olefin, such as ethylene or butene-1, a terpolymer of propylene, ethylene, and butene-1, or mixtures thereof.

The second skin layer (not shown) has a metal or coating layer applied. U.S. Pat. Nos. 6,077,602; 6,013,353; 5,981,079; 5,972,496; and 5,888,648 disclose the use of coatings and/or metal layers on a film, and are incorporated herein by reference. Suitable metals may include, for example, aluminum. The optical density of the metallized layer may be, for example, from 2.0 to 2.5 microns.

FIG. 3 is a cross sectional view of the thermoplastic label 10 of FIG. 2 with a cold glue 22 applied to the first side 101 of the first skin layer 12. Cold glues generally consist of solid base materials in combination with water. In one embodiment, the cold glue 22 is an aqueous solution of a natural adhesive (e.g., casein). In another embodiment, the cold glue 22 is an aqueous solution of a resin (e.g., PVA, EVA). Cold glues are widely used as an economical alternative to wrap around or pressure sensitive labels. Some cold glues are a colloidal suspension of various proteinaceous materials in water and are derived by boiling animal hides, tendons, or bones which are high in collagen. Alternatively, a cold glue can be derived from vegetables (e.g., starch, dextrin). Some cold glues are based on synthetic materials (resins). Examples of commercially available cold glues that are suitable for the invention include HB Fuller WB 5020, National Starch Cycloflex 14-200A, AABBITT 712-150, and Henkel 10-7026; the aforementioned list of cold glues are trademarks of HB Fuller, National Starch, AABBITT, and Henkel respectively.

FIG. 4 is a cross sectional view of the label 10 shown in FIG. 3 as attached to a container 26.

The container 26 has a surface 108 which is adjacent to the glue 22 applied to the first side 101 of the first skin layer 12 of the label 10. Suitable materials for the container 26 include glass, ceramics, thermoplastics, or other materials such as metals and metal cans, e.g., aluminum.

In another embodiment, a conventional filler and pigment, such as titanium dioxide, may be added to the core layer 14. Generally, from an economic viewpoint at least, it has not been considered to be of any particular advantage to use more than about 10 percent by weight of titanium dioxide. Greater amounts could be added for greater opacity so long as there is no undue interference with achieving the desired properties of the thermoplastic label 10.

Another embodiment has a core layer 14 comprising an opaque core material that is an oriented polypropylene structure cavitated in a special way so as to produce a pearlescent opaque appearance. A material of this type is described in U.S. Pat. No. 4,377,616 issued to Ashcraft, et al; this patent is incorporated herein by reference in its entirety. In accordance with this patent, the process of preparing the opaque film structure is as follows: a major proportion of a first thermoplastic material, e.g., polypropylene, is mixed with a minor proportion of second material of a higher melting point or of a higher glass transition temperature than the first material. This mixture is heated to a temperature of at least above the melting point of the first material.

Thereafter, the second material is uniformly dispersed throughout the molten first material in the form of microspheres. The microspheres can be conveniently prepared in a master batch of, e.g., polybutylene terephthalate, micro dispersed in molten form in molten polypropylene. This combination is then coextruded with a first skin layer 12 and a second skin layer (not shown) so as to have two skin layers on opposite surfaces of the core 14 comprising a combination of the materials.

In one embodiment, thereafter, this arrangement is biaxially oriented at a temperature and to a degree to form a strata of opacifying closed cell voids of dimensions X, Y and Z. Dimensions X and Y are major dimensions and dimension Z is a minor dimension at least generally corresponding to the diameter of the microspheres. In another embodiment, this arrangement is uniaxially oriented at a temperature and to a degree to form a strata of opacifying closed cells voids of dimensions X, Y, and Z. Dimension Z is major dimension and dimensions Y and Z are minor dimensions at least generally corresponding to the diameter of the microspheres. In some cases, it may be advantageous to include inorganic filler materials therein, for example, to promote the roughness of the surface of the skin.

Another embodiment has a core layer 14 comprising an opaque core material that is an oriented polypropylene structure that is cavitated by using COC's (cyclic olefin polymers and cyclic olefin copolymers). COC's are described in U.S. Pat. No. 6,048,608 issued to Peet, et al; this patent is incorporated herein by reference in its entirety.

Another embodiment has a core layer 14 comprising an opaque core that is a polyethylene structure that contains calcium carbonate.

Another embodiment of the thermoplastic label 10 has a tie layer (not shown) adjacent to the second side 102 of the first skin layer 12 and also adjacent to the first side 104 of the core layer 14. The tie layer (not shown) is between the first skin layer 12 and the core layer 14 in the interface 16. In another embodiment the tie layer (not shown) is a mixture of the materials of the first skin layer 12 and the core layer 14.

In another embodiment, the first skin layer 12 can delaminate from the thermoplastic label 10. In one embodiment, when the label 10 is removed from the container 26, the first skin layer 12 of the label 10 and the glue 22 remain attached to the container 26. This means that the first skin layer 12 has delaminated from the adjacent layers of the label 10.

The skin layer to be metallized may be coextruded directly on the core layer, with no tie layer, or the skin layer to be metallized may be coextruded to a tie layer, which is between the skin layer and the core layer. The thickness of this skin layer may be, for example, from about 1.5 to about 4 gauge units (100 gauge units=1 mil=25.4 μm). When the optional tie layer is present, it may have a thickness of from about 5 to 35 gauge units. An example of a five layer film structure is as follows:

| | |
|---|---|
| Homopolymer or copolymer skin to be metallized | 3 gauge units |
| Homopolymer tie layer | 20-35 gauge units |
| Core with cavitating agent | 95 gauge units |
| Tie layer with cavitating agent | 20-35 gauge units |
| Adhesive receiving skin with cavitating agent | 10 gauge units |

Definition of terms.
1. Acetals—A polymer or copolymer obtained by polymerization of formaldehyde and $CH_2$, and possibly other compounds.
2. Acrylic Resins—A polymer or copolymer of acrylic acid, methacrylic acid, esters of these acids, or acrylonitrile.
3. Biaxially Oriented—stretched in the machine direction, the direction of the feed, and in the transverse direction, perpendicular to the feed.
4. Calcium Carbonate—Same as aragonite, oyster shells, calcite, chalk, limestone, or marble. (Chemical formula is $CaCO_3$.)
5. Cavitated—Formation of gas chambers in a layer of a film after being subjected to tension.
6. Cavitating Agent—A material that is incompatible with the base material of a film material and has a higher melting point or glass transition temperature.
7. Ceramic Spheres—A small sphere produced predominately from silicates.
8. Coating—A layer applied to an outside surface of the film.
9. COCs—Cyclic olefin polymers and cyclic olefin copolymers, as described in, for example, U.S. Pat. No. 6,048,608 issued to Peet, et al.
10. Cold Glue—Adhesives used for container labeling and in particular water based adhesives, which consist of the solids base material (e.g. starch, PVA, latex, etc) in combination with water. Can be protein derived, vegetable, mineral, or synthetic.
11. Comprising—Made up of at least the named components (can also include other unnamed components).
12. Container—Any vessel constructed of glass, plastics, ceramics, or metal or metal cans, e.g., aluminum.
13. Film—A thin material from about 10 to about 100 microns thick.
14. Glass Spheres—A small sphere produced predominately from silica, soda ash, and lime.
15. Homopolymer Polypropylene—A high polymer derived from the single monomer propylene.
16. HCPP—highly crystalline homopolymer polypropylene.
17. Metal Beads—A small rounded piece of metal.
18. Metal Spheres—A small sphere of metal.
19. Nylons—A material selected from the family of polyamide polymers characterized by the presence of the amide group—CONH.
20. Polyamides—A polymer in which amide linkages (—CONH—) occur along the polymer chain.
21. Polybutylene Terephthalate—A thermoplastic polymer derived from 1,4-butanediol.
22. Polyesters—A polycondensation product of dicarboxylic acids with dihydroxy alcohols.
23. Polypropylene—A polymer of propylene.
24. Thermoplastic—A polymer that softens when exposed to heat and returns to its original condition when cooled to room temperature.

25. Thermoplastic Label—a label designed to be used on the outside of a package.
26. Thickness—a caliper thickness reading.
27. Uniaxially Oriented—stretched in only one direction, either machine, in the direction of the feed, or in the transverse direction, in the direction perpendicular to the feed direction.
28. Initial adhesion—when a label does not move from its applied desired position under stress (by pushing with hand or from stress applied for example by a bottling line), immediately after application.
29. Tack up—another term for initial adhesion.
30. Delamination—internal separation of a plastic film. Usually, separation of layers within a coextruded plastic film.
31. Fiber tear—when a paper label exhibits destruct bonds with a substrate. Loosely used in conjunction with plastic labels to mean delamination.

EXAMPLES

Data And Related Information

The following structures were produced. The thickness of the structures was about 2 mils, and the thickness of the cavitated skin layer was about 0.3 mils.

| % Structure | Example 1 | Example 2 |
|---|---|---|
| 15 | Homopolymer PP Skin | Homopolymer PP Skin |
| 70 | Cavitated Core (PP + PBT) | Cavitated Core (PP + PBT) |
| 15 | Homopolymer PP with 50% $CaCO_3$ Skin | Homopolymer PP with 25% $CaCO_3$ Skin |

Examples 1 & 2: these structures were adhered to a glass container with a water-based cold glue. In both Example 1 and 2, the propylene homopolymer skin layer without $CaCO_3$ cavitating agent was surface treated and then metallized. The surface treatment was a corona treatment with a target of 38-40 dynes/cm. The metal was aluminum.

The structure in example 1 exhibited good initial tack up and fiber tear (delamination) after just 1 hour aging.

A test was developed to measure the initial tack up. The test consisted of applying the label to the container with a cold glue and attempting to manually slide the label across the container. If the label was able to lock into position, then it exhibited good initial tack up. If the label was able to slide easily over the container, then it exhibited poor initial tack up.

The structure in Example 2 did not exhibit fiber tear, even after 24 hours.

A visual test was developed to measure fiber tear. A label was applied with cold glue and cured for two weeks in a cold room at 38° F. After the two week period, the label was peeled off the container, and it was determined how much of the label delaminated and remained on the container with the cold glue. If more than 50% of the label delaminated and remained on the container, then the label exhibited good fiber tear. If less than 50% of the label remained on the container, then the label exhibited poor fiber tear. In general, fiber tear indicates good tack up, which is a very important property.

In these examples, the $CaCO_3$ used had a median particle size of 1.4 microns. The PP was Exxon 4612, the PBT was Ticona 1300A, and the $CaCO_3$ was Omyacarb FT; the aforementioned list of materials are trademarks of ExxonMobil, Ticona, and Omyacarb, respectively.

SEM pictures of the two structures show that the structure in Example 1 was highly cavitated, with many layers and good separation between layers, and that the surface of the film had "holes". It is hypothesized that the "holes" allow the water to enter the cavitated skin, aiding the drying of the adhesive. It is further hypothesized that the "holes" create an anchor spot for the adhesive. The structure in example 2 is not very cavitated and the surface does not have any holes.

Example 3: The structure in Example 1 was reproduced, except that the PP skin with 50% $CaCO_3$ was replaced with a HDPE skin with 50% $CaCO_3$ (Schulman FCA-6080-HD with blend of Equistar M6060, the aforementioned materials are trademarks). As with the structures of Examples 1 and 2, the skin layer without $CaCO_3$ cavitating agent, i.e., the propylene homopolymer skin layer, was surface treated and then metallized. The surface treatment was a corona treatment with a target of 38-40 dynes/cm. The metal was aluminum.

This structure failed to exhibit fiber tear. SEM pictures show no cavitation or "holes" on the surface, probably because the process temperatures required to orient the PP were beyond the melting point of the HDPE. This indicates that the cavitation, and not just the presence of an absorbant material, is required.

This sample used a $CaCO_3$ with a median particle size of 3.2 microns.

Additional structures were produced for Examples 4-7. The skin composition and results are shown below. In each case, a propylene homopolymer layer was on the other surface of the core, and this propylene homopolymer layer was surface treated and metallized. The surface treatment was a corona treatment with a target of 38-40 dynes/cm. The metal was aluminum.

| Example | Skin | Intermediate Layer | Core | Results |
|---|---|---|---|---|
| 4 | Homopolymer PP with 25% $CaCO_3$ (~30% of structure) | NA | Cavitated Core (PP + PBT) | Good initial adhesion. Fiber tear. |
| 5 | Homopolymer PP with 35% $CaCO_3$ (~30% of structure) | NA | Cavitated Core (PP + PBT) | Good initial adhesion. Fiber tear. |
| 6 | HDPE (3-5% of structure) | Homopolymer PP with 35% $CaCO_3$ (~30% of structure) | Cavitated Core (PP + PBT) | Did not adhere as well. No fiber tear. |
| 7 | Homopolymer PP with 35% $CaCO_3$ (~30% of structure) | NA | Homopolymer PP with 25% $CaCO_3$ | Good initial adhesion. Fiber tear. |

Example 6 shows that it is necessary to have a cavitated layer adjacent to the adhesive.

The similar performance of Examples 5 and 7 shows that the choice of cavitating agent for the core is not critical.

Interestingly, the same loading of $CaCO_3$ (25%) that had failed in Example 2 in the first test worked in Example 4 with the same loading of $CaCO_3$ (25%) and a thicker skin thickness. This indicates that the total amount of cavitator (loading*skin thickness) is important, and that the larger size of the cavitating particles may be important.

In each of these cases, the $CaCO_3$ used had a median particle size of about 2 microns. The PP was Exxon 4612, the PBT was Ticona 1300A, and Ampacet's Pearl 70 was the CaCO$_3$ masterbatch (trademarks of ExxonMobil, Ticona, and Ampacet, respectively).

Additional structures were produced for Examples 8-26. The skin composition and results are shown below. For each of Examples 8-25, i.e., for each of the polypropylene-base structures, a propylene homopolymer tie layer (L2) and a propylene homopolymer, copolymer (EP copolymer), or terpolymer (EPB terpolymer) skin (L1) was on the other surface of the core, in the order of first L2 and then L1 (for an overall order of L1/L2/L3/L4/L5), and the layer L1 was surface treated and metallized. The surface treatment was a corona treatment with a target of 38-40 dynes/cm. The metal was aluminum.

For Example 26, i.e., for the polyethylene-based structure, the skin (L1) and the tie layer (L2) were polyethylene, and both the skin layer L1 and the HDPE L5 layer were surface treated (only L1 was metallized). The surface treatment was a corona treatment with a target of 38-40 dynes/cm. The metal was aluminum.

case, the skin layer that was not cavitated, i.e., the PP skin in Example 27 and the copolymer skin of Examples 28-30, was surface treated and metallized. The surface treatment was a corona treatment with a target of 38-40 dynes/cm. The metal was aluminum.

Example 27

PP Skin
Cavitated Core (PP + PBT)
PP with 50% CaCO$_3$ Skin

Example 28

Copolymer Skin
PP Tie
Cavitated Core (PP + 5% CaCO$_3$ (Pearl 70))
PP w/35% CaCO$_3$ (Pearl 70) Tie
PP w/35% CaCO$_3$ (Pearl 70) Skin

| Example | Core - L3 | Tie - L4 | Adhesive receiving skin - L5 | Results |
|---|---|---|---|---|
| 8 | PP + 6% PBT | PP + 35% CaCO$_3$ | PP + 35% CaCO$_3$ | Good initial adhesion. Fiber Tear |
| 9 | PP + 6% PBT | PP + 35% CaCO$_3$ | HDPE (3-5% of structure) | Poor initial Adhesion. No Fiber Tear |
| 10 | PP + 10% CaCO$_3$ | PP + 35% CaCO$_3$ | PP + 35% CaCO$_3$ | Good initial adhesion. Fiber Tear |
| 11 | PP + 35% CaCO$_3$ | PP + 35% CaCO$_3$ | PP + 35% CaCO$_3$ | Good initial adhesion. Fiber Tear |
| 12 | PP + 22% CaCO$_3$ | PP + 35% CaCO$_3$ | PP + 35% CaCO$_3$ | Good initial adhesion. Fiber Tear |
| 13 | PP + 10% CaCO$_3$ | PP + 35% CaCO$_3$ | PP + 35% CaCO$_3$ | Good initial adhesion. Fiber Tear |
| 14 | PP + 22% CaCO$_3$ | PP + 35% CaCO$_3$ | PP + 35% CaCO$_3$ | Good initial adhesion. Fiber Tear |
| 15 | PP + 35% CaCO$_3$ | PP + 35% CaCO$_3$ | PP + 35% CaCO$_3$ | Good initial adhesion. Fiber Tear |
| 16 | PP + 8% COC | PP + 35% CaCO$_3$ | PP + 35% CaCO$_3$ | Good initial adhesion. Fiber Tear |
| 17 | PP + 8% COC | PP + 8% COC | PP + 8% COC | Poor initial Adhesion. No fiber tear |
| 18 | PP + 8% COC | PP + 35% CaCO$_3$ | PP + 35% CaCO$_3$ | Good initial adhesion. Fiber Tear |
| 19 | PP + 8% COC | HCPP + 35% CaCO$_3$ | HCPP + 35% CaCO$_3$ | Good initial adhesion. Fiber Tear |
| 20 | PP + 10% CaCO$_3$ | HCPP + 35% CaCO$_3$ | HCPP + 35% CaCO$_3$ | Good initial adhesion. Fiber Tear |
| 21 | PP + 10% CaCO$_3$ | PP | PP + 35% CaCO$_3$ | Good initial adhesion. Fiber Tear |
| 22 | HCPP + 8% COC | PP + 35% CaCO$_3$ | PP + 35% CaCO$_3$ | Good initial adhesion. Fiber Tear |
| 23 | HCPP + 8% COC | HCPP + 35% CaCO$_3$ | HCPP + 35% CaCO$_3$ | Good initial adhesion. Fiber Tear |
| 24 | HCPP + 10% CaCO$_3$ | HCPP + 35% CaCO$_3$ | HCPP + 35% CaCO$_3$ | Good initial adhesion. Fiber Tear |
| 25 | HCPP + 10% CaCO$_3$ | PP + 35% CaCO$_3$ | PP + 35% CaCO$_3$ | Good initial adhesion. Fiber Tear |
| 26 | HDPE + CaCO$_3$ | HDPE + CaCO$_3$ | HDPE + CaCO$_3$ | Good initial adhesion. Fiber Tear |

The PP was Exxon 4612 or Fina 3371. The HCPP was Amoco 9117. The PBT was Ticona 1300A. The COC was Ticona Topas 6017. Ampacet's Pearl 70 was the PP-CaCO$_3$ masterbatch. The HDPE was Exxon 7845, the HDPE-CaCO$_3$ masterbatch was Ampacet M-6211; the aforementioned materials are trademarks of ExxonMobil, Fina, BP Amoco, Ticona, Ampacet, ExxonMobil, and Ampacet, respectively.

Additional structures were produced for Examples 27-30. The skin composition and results are shown below. In each -continued Example 29

Copolymer Skin
PP Tie
Cavitated Core (PP + 5% CaCO$_3$ (Pearl 2))
PP w/35% CaCO$_3$ (Pearl 70) Tie
PP w/35% CaCO$_3$ (Pearl 70) Skin -continued Example 30

Copolymer Skin
PP Tie
Cavitated Core (PP + 5% CaCO₃ (Pearl 2))
PP w/35% CaCO₃ (Pearl 2) Tie
PP w/35% CaCO₃ (Pearl 2) Skin The propylene (PP) was Exxon 4612 propylene homopolymer and the PBT was 1300A from Ticona, for each of Examples 27-30. The CaCO₃ of the skin in Example 27 was Omyacarb FT. In Example 28, the CaCO₃ of the cavitated core layer, tie and skin layers was supplied as a masterbatch of Ampacet's Pearl 70. In Example 29, the CaCO₃ of the cavitated core layer was supplied as a masterbatch of Ampacet's Pearl 2, whereas the CaCO₃ of the tie and skin layers was supplied as a masterbatch of Ampacet's Pearl 70. For Example 30, the CaCO₃ of the cavitated core layer, tie and skin layers was supplied as a masterbatch of Ampacet's Pearl 2. The copolymer skin of Examples 28-30 was EP 8573, an ethylene-propylene copolymer available from Fina Oil and Chemical Co., Chemical Div., Dallas, Tex.

These structures were metallized using aluminum in a Bell jar metallizer (2.5 target for optical density). The appearance was markedly different among the four samples. The most mirrored appearance was seen in Example 27, with Example 30 having the second best mirrored appearance, and Example 29 having the third best mirrored appearance. The particle size and shape of the PBT coupled with the homopolymer skin of Example 27 combine to make the metallized skin surface smooth.

Significant differences were seen between the Pearl 70 (Example 28) and Pearl 2 (Examples 29 and 30) samples. The particle size median of the Pearl 70 is 2.0 microns, and the particle size median of Pearl 2 is 1.5 microns.

Using the smaller particle size calcium carbonate of Pearl 2 in the core layer with a copolymer skin improved the surface smoothness significantly and improved the mirrored metal surface appearance. Measurements of surface roughness were taken using a perthometer stylus.

While a thicker tie layer tends to reduce the roughness of the surface, the more significant difference in appearance and surface smoothness was a result of using larger versus smaller particle sizes in the core.

It should be evident that this disclosure is by way of example, and that various changes can be made by adding, modifying, or eliminating details without departing from the fair scope of the teaching contained in the disclosure. The invention therefore is not limited to particular details of this disclosure except to the extent that the claims that follow are necessarily are so limited.

What is claimed is:

1. A metallized thermoplastic label comprising:
   (a) a first skin layer comprising a thermoplastic and a first cavitating agent, wherein the first skin layer has a first side and a second side, the first skin layer is cavitated, and the first side of the first skin layer is adapted to be used in contact with a cold glue adhesive;
   (b) a core layer comprising polypropylene and a second cavitating agent, wherein the core layer has a first side and a second side, and the first side of the core layer is adjacent to the second side of the first skin layer; and
   (c) a second skin layer comprising polypropylene, wherein the second skin layer has a first side and a second side, the first side of the second skin layer is adjacent to the second side of the core layer, and the second side is metallized, wherein said second cavitating agent has a median particle size of 1.5 microns or less and said metallized surface has a bright mirrored appearance.

2. A metallized thermoplastic label according to claim 1, wherein, prior to metallization, said second skin layer has a surface roughness $R_a$ of from 0.1 to 0.3 microns.

3. A metallized thermoplastic label comprising,
   (a) a first skin layer comprising a thermoplastic and a first cavitating agent, wherein the first skin layer has a first side and a second side, the first skin layer is cavitated, and the first side of the first skin layer is adapted to be used in contact with a cold glue adhesive;
   (b) a core layer comprising polypropylene and a second cavitating agent, wherein the core layer has a first side and a second side, and the first side of the core layer is adjacent to the second side of the first skin layer; and
   (c) a second skin layer comprising polypropylene, wherein the second skin layer has a first side and a second side, the first side of the second skin layer is adjacent to the second side of the core layer, and the second side is metallized,
   wherein said second cavitating agent has a median particle size of 2 microns or more, and further wherein, prior to metallization, said second skin layer has a surface roughness $R_a$ of from 0.3 to 1.3 microns, and wherein said metallized surface has a less bright mirrored appearance than a comparative metallized thermoplastic label of identical structure, except that the comparative metallized thermoplastic label has a second cavitating agent with a median particle size of 1.5 microns or less, and except that the comparative metallized thermoplastic label, prior to metallization, has a second skin layer with a surface roughness $R_a$ of from 0.1 to 0.3 microns.

4. A metallized thermoplastic label according to claim 3, wherein, prior to metallization, said second skin layer has a surface roughness $R_a$ of from 1.0 to 1.3 microns, and wherein said metallized surface has a less bright mirrored appearance than a comparative metallized thermoplastic label of identical structure, except that the comparative metallized thermoplastic label has a second cavitating agent with a median particle size of 1.5 microns or less, and except that the comparative metallized thermoplastic label, prior to metallization, has a second skin layer with a surface roughness $R_a$ of from 0.1 to 0.3 microns.

5. A metallized thermoplastic label according to claim 1, wherein the polypropylene of the second skin layer (c) is a propylene homopolymer, an ethylene-propylene copolymer, a propylene-butene-1 copolymer, or a ethylene-propylene-butene-1 terpolymer.

6. A metallized thermoplastic label according to claim 1, wherein the second skin layer, prior to being metallized, is surface treated with corona treatment, flame treatment, or plasma treatment.

7. A method for preparing a metallized thermoplastic label according to claim 1, said method comprising the steps of:
   (i) forming an extrudable mass of said thermoplastic of said first skin layer and said first cavitating agent;
   (ii) forming an extrudable mass of said polypropylene of said core layer and said second cavitating agent;
   (iii) forming an extrudable mass of said polypropylene of said second skin layer;
   (iv) coextruding the extrudable masses of steps (i), (ii) and (iii) to form a cast film;

(v) stretching said cast film of step (iv) in the machine direction;
(vi) stretching the stretched film of step (v) in the transverse direction; and
(vii) applying a metal layer to the to the surface of said second skin layer.

8. A method according to claim 7, wherein, prior to metallization, said second skin layer has a surface roughness $R_a$ of from 0.1 to 0.3 microns.

9. A thermoplastic label adapted to be applied to a container, comprising:
(a) a metallized label according to claim 1; and
(b) a cold glue applied to the first side of the first skin layer wherein the label is adapted to be applied to the container.

10. A container having a thermoplastic label comprising:
(a) a surface of the container;
(b) a cold glue adjacent to the surface; and
(c) a metallized label according to claim 1, wherein the first side of the first skin layer is adjacent to the cold glue.

11. A metallized thermoplastic label comprising:
(a) a first skin layer comprising a thermoplastic and a first cavitating agent, wherein the first skin layer has a first side and a second side, the first skin layer is cavitated, and the first side of the first skin layer is adapted to be used in contact with a cold glue adhesive;
(b) a core layer comprising polypropylene and a second cavitating agent, wherein the core layer has a first side and a second side; and
(c) a second skin layer comprising polypropylene, wherein the second skin layer has a first side and a second side, and the second side is metallized, wherein one or more tie layers are disposed between the first side of the core layer and the second side of the first skin layer, one or more tie layers are disposed between The first side of the second skin layer and the second side of the core layer, said second cavitating agent has a median particle size of 1.5 microns or less and said metallized surface has a bright mirrored appearance.

12. A metallized thermoplastic label according to claim 11, wherein only one tie layer is disposed between the first side of the core layer and the second side of the first skin layer, only one tie layer is disposed between the first side of the second skin layer and the second side of the core layer, and both tie layers comprise propylene homopolymer.

13. A metallized thermoplastic label according to claim 11, wherein only one tie layer is disposed between the first side of the core layer and the second side of the first skin layer, only one tie layer is disposed between the first side of the second skin layer and the second side of the core layer, both the first skin layer and the tie layer between the first side of the core layer and the second side of the first skin layer comprise the first cavitating agent, and the first cavitating agent has a median particle size of 1.5 microns or less.

14. A method for preparing a metallized thermoplastic label according to claim 11, the method comprising the steps of:
(i) forming an extrudable mass of the thermoplastic of the first skin layer and the first cavitating agent;
(ii) forming an extrudable mass of the one or more tie layers that are to be disposed between the first side of the core layer and the second side of the first skin layer;
(iii) forming an extrudable mass of said polypropylene of said core layer and said second cavitating agent;
(iv) forming an extrudable mass of the one or more tie layers that are to be disposed between the first side of the second skin layer and the second side of the core layer;
(v) forming an extrudable mass of said polypropylene of said second skin layer;
(vi) coextruding the extrudable masses of steps (i), (ii), (iii), (iv), and (v) to form a cast film;
(vii) stretching said cast film of step (vi) in the machine direction;
(viii) stretching the stretched film of step (vii) in the transverse direction; and
(ix) applying a metal layer to the to the surface of said second skin layer.

15. A metallized thermoplastic label comprising:
(a) a first skin layer comprising a thermoplastic and a first cavitating agent wherein the first skin layer has a first side and a second side, the first skin layer is cavitated, and the first side of the first skin layer is adapted to be used in contact with a cold glue adhesive;
(b) a core layer comprising polypropylene and a second cavitating agent, wherein the core layer has a first side and a second side, and the first side of the core layer is adjacent to the second side of the first skin layer; and
(c) a second skin layer comprising polyethylene, wherein the second skin layer has a first side and a second side, the first side of the second skin layer is adjacent to the second side of the core layer, and the second side is metallized, wherein said second cavitating agent has a median particle size of 1.5 microns or less and said metallized surface has a bright mirrored appearance.

* * * * *